June 24, 1952  B. B. BROWN  2,601,363
NAIL BEAM
Filed Nov. 29, 1946
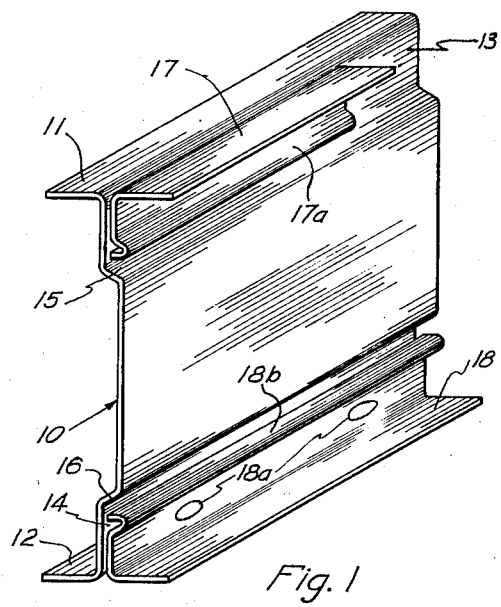
Fig. 1
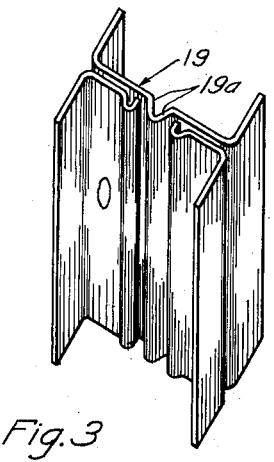
Fig. 3
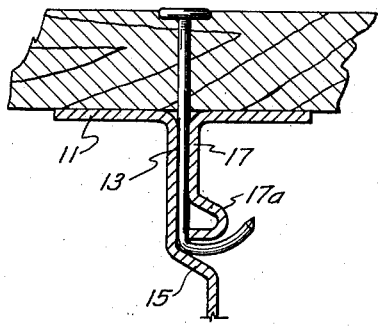
Fig. 2
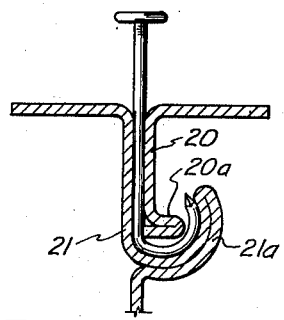
Fig. 4
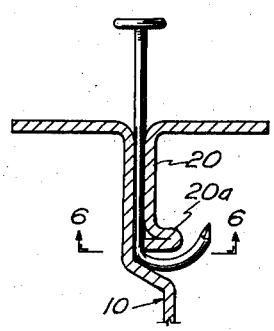
Fig. 5
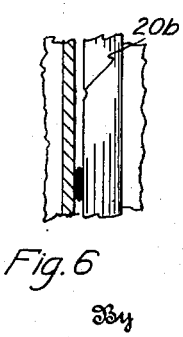
Fig. 6
Fig. 7
Brinkley B. Brown
Inventor
J. Vincent Martin
Ralph R. Browning
James B. Simms
By
Attorneys Patented June 24, 1952

2,601,363

UNITED STATES PATENT OFFICE 2,601,363

NAIL BEAM

Brinkley B. Brown, Houston, Tex., assignor to Metallic Building Company, Houston, Tex., a partnership composed of Brinkley B. Brown and Charles R. McDaniel Application November 29, 1946, Serial No. 712,964

1 Claim. (Cl. 189—34)

This invention relates to improvements in metal structural members and refers more particularly to structural members having parts arranged to receive nails or other fastening shafts whereby wood, fiber board and other building materials or members may be secured thereto.

In structural members of this type, it is desirable to provide a construction in which the nail or other fastening shaft may be securely anchored and in which the structure can be readily and economically fabricated and assembled. In addition, economy, ease of handling and cost of transportation demands a structure utilizing a minimum quantity of material.

An object of this invention is to provide a structural member of the character described in which the component parts may be readily and cheaply fabricated and assembled into the finished product.

Another object is to provide a structural member of the character described in which the component parts may be readily and cheaply fabricated and assembled into the finished product and wherein the nails or fastening shafts are securely anchored against accidental removal.

A further object is to provide a structural member of the character described in which the component parts may be readily and cheaply fabricated and assembled into the finished product and wherein the nails or fastening shafts upon insertion will be gripped to hold them against tilting during further insertion and during further insertion will be formed with hooks upon their inserted ends.

Yet another object is to provide a structure of the character described having incorporated therein means for forming a hook upon the piercing end of a fastening shaft or nail wherein a spring member is included in the hook forming means.

Other and further objects will appear from the following description:

In the accompanying drawings which form a part of the instant specification and are to be read in conjunction therewith and wherein like reference numerals are employed to designate like parts in the various views:

Fig. 1 is a perspective view of a structural member embodying this invention;

Fig. 2 is an enlarged fragmentary sectional view of the member shown in Fig. 1 illustrating a wooden member secured thereto;

Fig. 3 is a perspective view of a modified structural member embodying this invention;

Fig. 4 is a fragmentary sectional view of a modified structural member embodying this invention;

Fig. 5 is a fragmentary sectional view of another modification of this invention;

Fig. 6 is a view taken along the line 6—6 in Fig. 5 in the direction of the arrows; and Fig. 7 is a fragmentary sectional view of another modification.

Referring to the drawings, and more particularly to the embodiment shown in Figs. 1 and 2, the structural member is shown to be I-shaped and comprises a support element 10 having flanges 11 and 12 at its respective ends. Adjacent the flanges 11 and 12 are elongated surfaces 13 and 14, respectively. These surfaces are interrupted by laterally extending portions 15 and 16, respectively. The web intermediate the lateral extensions constitutes the remainder of the supporting element.

Surfaces 13 and 14 are substantially straight flat surfaces and have secured thereto metal strips 17 and 18. Strips 17 and 18 have flat surfaces which confront surfaces 13 and 14, respectively, and are spaced sufficiently therefrom to permit a driving or wedging of nails or other fastening shafts between the confronting surfaces. The strips are preferably secured to the supporting element by spot welds indicated at 18a.

Strips 17 and 18 have rolls 17a and 18b at their edges adjacent portions 15 and 16 of the supporting element. The arrangement of rolls 17a and 18b is such that their ends confront the surfaces 13 and 14 at approximately the joinder of these surfaces with the laterally extending portions. Thus, the rolls serve as spring members the inherent resiliency of the metal resisting the passage of nails or other fastening members between the ends of the rolls and the surfaces 13 and 14. By this means the piercing ends of the nails are guided toward the radially extending portions and resiliently gripped and held in alignment whereby continued driving of the nails effects the formation of a hook at the end thereof. Thus the necessity and expense of providing nail receiving grooves on either the surfaces 13 or 14 or strips 17 or 18, is eliminated. This hook is best shown in Fig. 2 and engages the edge of strip 17 or 18 as the case may be to securely anchor the nail in place, as on removal of the nail the curved or hook portion of the nail must pass the edge of the strip and be straightened out in passing. This provides a positive resistance to the displacement of the nail when once driven into place as shown in Fig. 2.

In the modification of Fig. 3 all the members and parts are the same as that shown in Fig. 1 with the exception that the supporting element 19 has a reduced web portion intermediate laterally extending portions 19a.

In the modification of Fig. 4 the strip 20 has a folded roll portion 20a which performs the same function as the rolls 17a and 18b in the embodiment shown in Fig. 1. The support element 21 has a laterally extending portion 21a of modified configuration but which performs the same function as the portions 15 and 16 of the structural member shown in Fig. 1.

The structure shown in Fig. 5 is an assembly in which the support element 10 has strips 20 substituted for the strips 17 and 18. By reference to Fig. 6, which shows the structure of Fig. 5 with the nail removed, it is seen that the nail when driven into place has formed a slight groove 20b in the roll edge. This groove grips the nail and along with the gripping provided by the resilient tension supplied by the spring member or roll insures alignment of the nail as it is driven against the laterally extending, hook forming portion. Similar grooves are also formed in the ends of rolls 17a and 18b and function in a similar manner.

In the embodiment shown in Fig. 7, the strip 22 is substituted for the strip 17 and is secured to surface 13 of a support element 10. The strip 22 does not have a roll at its edge adjacent portion 15. While this strip is effective in most instances to secure the fastening elements the type strips shown in the other figures are preferred because of the action of the spring members or rolls carried thereby.

It is to be understood that these modifications are shown by way of illustration and not by way of limitation.

In operation the support elements may be rolled or otherwise formed. The strips such as 17 and 18 are secured to the elongated surfaces of the support element and are spaced slightly therefrom whereby nails or other fastening shafts driven between the strips and elongated surfaces are wedged therebetween. When the nails have been driven to the point where their piercing end engages shoulders 15 their piercing ends are formed into a hook by continued driving of the nails.

The metal strips are preferably spot welded to the support elements and due to the flat character of the confronting surfaces between the support elements and strips the nails can be driven at any point along the joinder of the strip and support element except where the spot welds occur and prevent reception of a nail.

It will be seen that the objects of this invention have been accomplished. There has been provided a structure which may be readily fabricated in an economical manner and which utilizes a minimum amount of materials. The structural members are of great utility, and may be adapted into a number of configurations of usual structural design or shape. The construction is such that wood, pressed wood, fiber boards or the like may be securely anchored to rigid metal structural members.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof it is to be understood that all matter herein set forth or shown in the accompanying drawings is to be interpreted as illustrative and not in a limiting sense.

Having described my invention, I claim:

A structural member adapted to receive a driven fastening shaft including, a support element having a substantially flat surface formed with a lateral offset spaced from one longitudinal edge thereof and extending substantially parallel to said edge, a metallic strip secured to the element between the longitudinal edge and the offset in said element and spaced from the surface of the element throughout most of its length, the offset in the support element being in a direction outwardly of that surface of the element to which the strip is secured, one longitudinal edge portion of said strip being contiguous to the lateral offset, and said longitudinal edge portion of the strip being bent upon itself outwardly and then inwardly to form a longitudinal bead on said strip, the edge of said bead being directed inwardly in confronting spaced relationship to the surface of the element, the beaded portion of said strip coacting with the flat surface and lateral offset of the support element to resiliently engage and guide the end of a fastening shaft driven between the element and strip, and said lateral offset in the support element being generally hook-shaped in cross-section.

BRINKLEY B. BROWN.

REFERENCES CITED

The following references are of record in the file of this patent:

UNITED STATES PATENTS

| Number | Name | Date |
|---|---|---|
| 522,736 | Krause | July 10, 1894 |
| 991,603 | Brooks | May 9, 1911 |
| 1,964,403 | Loucks | June 26, 1934 |
| 2,063,714 | Waugh et al. | Dec. 8, 1936 |
| 2,159,182 | Sahlmann | May 23, 1939 |
| 2,257,338 | Hull | Sept. 30, 1941 |
| 2,276,040 | Hull | Mar. 10, 1942 |